(12) United States Patent
Clauss et al.

(10) Patent No.: US 12,498,120 B2
(45) Date of Patent: Dec. 16, 2025

(54) STEAM TREATMENT APPLIANCE AND METHOD FOR CLEANING A STEAM TREATMENT APPLIANCE

(71) Applicant: BSH Hausgeräte GmbH, Munich (DE)

(72) Inventors: Christian Clauss, Obernai (FR); Hakim Marko, Illkirch-Graffenstaden (FR)

(73) Assignee: BSH Hausgeräte GmbH, Munich (DE)

( * ) Notice: Subject to any disclaimer, the term of this patent is extended or adjusted under 35 U.S.C. 154(b) by 1128 days.

(21) Appl. No.: 17/439,429

(22) PCT Filed: Apr. 22, 2020

(86) PCT No.: PCT/EP2020/061218
§ 371 (c)(1),
(2) Date: Sep. 15, 2021

(87) PCT Pub. No.: WO2020/224964
PCT Pub. Date: Nov. 12, 2020

(65) Prior Publication Data
US 2022/0186938 A1 Jun. 16, 2022

(30) Foreign Application Priority Data
May 3, 2019 (DE) .................. 10 2019 206 323.3

(51) Int. Cl.
*F24C 14/00* (2006.01)
*F22B 1/28* (2006.01)
(Continued)

(52) U.S. Cl.
CPC ............ *F24C 14/005* (2013.01); *F22B 1/284* (2013.01); *F22B 37/50* (2013.01); *F24C 15/003* (2013.01)

(58) Field of Classification Search
CPC ........ F22B 1/284; F22B 37/50; F24C 14/005; F24C 15/003
(Continued)

(56) References Cited

U.S. PATENT DOCUMENTS 5,193,491 A * 3/1993 Oslin .................... F22B 37/486
122/401
9,581,339 B2 * 2/2017 Yang ..................... F24C 15/327
(Continued)

FOREIGN PATENT DOCUMENTS

DE 102007005503 A1 * 7/2008
DE 102010039515 A1 2/2012
(Continued)

OTHER PUBLICATIONS

DE_102007005503_A1_Translation (Year: 2008).*
(Continued)

*Primary Examiner* — Steven B Mcallister
*Assistant Examiner* — Benjamin W Johnson
(74) *Attorney, Agent, or Firm* — Michael E. Tschupp; Andre Pallapies; Brandon G. Braun

(57) ABSTRACT

A steam treatment appliance includes a steam treatment space, a fixed water connection, and a receiving container fillable with fresh water via the fixed water connection and having a discharge opening. Arranged outside the steam treatment space is a steam generator having a water inlet for fluidic connection to the discharge opening of the receiving container and a water outlet for fluidic connection to the receiving container. A cleaning product inlet is fluidically connected to the receiving container. A valve system is switchable between a first switch position in which a closed liquid circuit is formed with at least the receiving container, the steam generator, and a pump while bypassing the steam treatment space, and a second switch position in which the (Continued)

liquid circuit is opened to connect the water outlet of the steam generator to a temporary waste water connection.

11 Claims, 4 Drawing Sheets

(51) Int. Cl.
    *F22B 37/50*     (2006.01)
    *F24C 15/00*     (2006.01)
(58) Field of Classification Search
    USPC .......................................................... 126/20
    See application file for complete search history.

(56) References Cited

U.S. PATENT DOCUMENTS

| | | | |
|---|---|---|---|
| 10,398,249 B2 | 9/2019 | Becker | |
| 2006/0249136 A1* | 11/2006 | Reay | F24C 15/327 |
| | | | 126/20 |
| 2015/0030728 A1* | 1/2015 | Raghavan | A47J 27/04 |
| | | | 99/330 |
| 2018/0070596 A1 | 3/2018 | Kim | |

FOREIGN PATENT DOCUMENTS

| | | | |
|---|---|---|---|
| DE | 102017102796 A1 * | 8/2018 | |
| EP | 3180984 B1 | 4/2019 | |
| FR | 2958719 A1 | 10/2011 | |

OTHER PUBLICATIONS

DE-102017102796-A1—Translation (Year: 2018).*
National Search Report DE 10 2019 206 323.3 dated Jan. 31, 2020.
International Search Report PCT/EP2020/061218 dated Jul. 3, 2020.

* cited by examiner

STEAM TREATMENT APPLIANCE AND METHOD FOR CLEANING A STEAM TREATMENT APPLIANCE

CROSS-REFERENCES TO RELATED APPLICATIONS

This application is the U.S. National Stage of International Application No. PCT/EP2020/061218, filed Apr. 22, 2020, which designated the United States and has been published as International Publication No. WO 2020/224964 A1 and which claims the priority of German Patent Application, Serial No. 10 2019 206 323.3, filed May 3, 2019, pursuant to 35 U.S.C. 119 (a)-(d).

BACKGROUND OF THE INVENTION

The invention relates to a steam treatment appliance having a steam treatment space, which has a fixed water connection, a receiving container that can be filled with fresh water by means of the fixed water connection and has a discharge opening, a steam generator arranged outside the steam treatment space having a water inlet that can be fluidically connected to the discharge opening of the receiving container and a water outlet that can be fluidically connected to the receiving container, and a pump. The invention also relates to a corresponding method. In particular the invention can be applied advantageously to household steam cooking appliances.

DE 10 2012 109 631 A1 discloses a cooking vessel with a cooking space for treating items to be cooked, and with a steam generation facility for generating steam. The water used for generating the steam can be supplied via a coupling facility of the steam generating facility. The coupling facility has a connection facility suitable for connecting to a fixed water connection. In this regard a pipe facility is provided between the connection facility and the steam generating facility, making available a flow connection suitable for routing water and incorporating a free fall section. A water routing facility is arranged in the free fall section.

FR 29587 19 A1 discloses an oven that has a cooking space realized in a casing and a steam generator that generates steam that can be introduced into the cooking space. A water filling valve supplies a hydraulic system with water from the steam generator. A water filling part comprises a water supply opening of the hydraulic system. An outflow part has a water outflow opening of the hydraulic system. The water supply opening and the water outflow opening are accessible on an outer side of the oven in a discharge position of the valve.

BRIEF SUMMARY OF THE INVENTION

The object of the present invention is to at least partly overcome the drawbacks of the prior art, and in particular make available a user-friendly and effective option for cleaning, in particular descaling, water-carrying pipes inside a steam treatment appliance.

This object is achieved in accordance with the features of the independent claims. Advantageous embodiments form the subject of the dependent claims, the description, and the drawings.

The object is achieved by means of a steam treatment appliance having a steam treatment space, which has
a fixed water connection,
a receiving container that can be filled with fresh water by means of the fixed water connection and has a discharge opening,
a steam generator arranged outside the steam treatment space having a water inlet that can be fluidically connected to the discharge opening of the receiving container and a water outlet that can be fluidically connected to the receiving container,
a cleaning product inlet, which can be fluidically connected to the receiving container,
at least one pump,
a cleaning product inlet, which can be fluidically connected to the receiving container,
a temporary waste water outlet, and
a valve system, which can be switched between at least two switch positions,
wherein
in a first switch position a closed liquid circuit is formed with the receiving container, the steam generator, and the pump as components while bypassing the steam treatment space, and
in a second switch position the circuit is opened to connect the water outlet of the steam generator to the temporary waste water connection.

This steam treatment appliance produces the advantage that it can be filled with fresh water automatically via the fixed water connection without having to be connected to a waste water network. This in turn enables simple integration into a kitchen. Additionally this steam treatment appliance can be cleaned in a particularly user-friendly manner. Due to the option of making available a closed liquid circuit the cleaning can be carried out particularly effectively, which in turn helps to save cleaning product. Moreover this steam treatment appliance can be implemented particularly simply in constructional terms.

In particular, for a cleaning sequence, cleaning product can be introduced via the cleaning product inlet into the receiving container and then the cleaning product, in the first switch position of the valve system, circulated in the circuit by means of the pump, so that it flows through and thereby cleans the receiving container, the steam generator, the pump itself, and also ducts or pipes (pipelines, hoses, etc.) connecting them, and where relevant further components of the circuit such as valves etc. After sufficient circulation in the circuit the valve system is switched over to its second switch position so that a user can then discharge the cleaning product from the appliance via the temporary waste water outlet, e.g. into a container such as a bucket or similar. The user does not need a fixed connection to a waste water system to do this however.

In particular the steam treatment appliance is a household appliance. In a development it has at least one heating element for heating the steam treatment space, and can then also be described as a steam cooking appliance, and its steam treatment space as a cooking space. In particular the steam treatment appliance can be a cooking appliance, e.g. an oven, with additional steam treatment functionality. Optionally items placed in the cooking space can be cooked without adding steam, cooked while adding steam, or just treated with steam.

A fixed water connection can be understood to mean in particular a connection to the fixed connection to a fresh water network or a fresh water supply pipe. The fixed connection is typically provided to connect the appliance permanently to the fresh water network.

In particular the receiving container can be filled with fresh water by means of the fixed water connection via a free fall section. This achieves the advantage that liquid cannot move out of the steam treatment appliance into the fresh water network. In a development the fixed water connection has an electrically switchable opening valve to allow or prevent a supply of fresh water into the receiving container in a targeted manner. The receiving container can be open at its top side, in particular in the shape of a bowl. An open end of the fixed water connection is located in particular above the open top side.

The discharge opening of the receiving container can be arranged at least approximately at a deepest point of the receiving container that can be filled with liquid, e.g. on the bottom side. This achieves the advantage that in practice the receiving container can be emptied completely just by the effect of gravity.

The steam generator can be a so-called boiler or a flow-type water heater. It can be filled with liquid via the water inlet and in fact—since the water inlet can be fluidically connected to the discharge opening of the receiving container—with liquid that is discharged from the discharge opening of the receiving container. Liquid can be discharged from the steam generator via the water outlet. The water outlet is arranged in particular on the bottom side for this purpose. The water inlet can be arranged in particular on the cover side. To generate steam the steam generator has at least one heating element, upon activation of which water located in the steam generator can be heated to boiling temperature. The steam generated as a result is introduced into the steam treatment space.

The steam generator can have a level sensor. This can be set up to identify or detect an empty status and/or the reaching of a maximum level of the steam generator. Depending on the level currently present the steam treatment appliance can e.g. activate or deactivate the at least one heating element, open or close a valve of the fixed water connection, open or close a valve between the receiving container and the steam generator, etc. In particular the shutoff valve of the fixed water connection can be switched depending on a level in the steam generator during a steam treatment operation; if there is sufficient water in the steam generator then the shutoff valve remains closed. If fresh water is to be topped up due to a low level however, the level sensor causes the shutoff valve to open after which fresh water flows through the receiving container into the steam generator. Once the level in the steam generator has risen sufficiently the level sensor switches the shutoff valve to closed again.

Given that the water outlet of the steam generator can be fluidically connected to the receiving container the receiving container can be filled not only with fresh water but also with liquid discharged from the water outlet.

The pump is a liquid pump. In a development the pump is a self-locking pump, i.e. it acts as being closed when it is inactive or switched off. This achieves the advantage that the number of components needed can be kept small. In place of a self-locking pump however it is also possible in principle for a functionally similar arrangement of a non-locking pump (which allows liquid through when switched off) and a check valve to be used, e.g. in a fluidic series connection. The pump can be a displacement pump (volumetric pump) for example or a centrifugal pump. In this regard a centrifugal pump has the advantage that it is particularly quiet and robust. A displacement pump has the advantage that it can be realized to be self-locking in a particularly simple manner.

A cleaning product inlet is understood in particular to mean a component of the steam treatment appliance by means of which cleaning product can be introduced into the steam treatment appliance. That the cleaning product inlet can be fluidically connected to the receiving container comprises in particular that after being introduced the cleaning product moves into the receiving container, in particular directly into the receiving container. A connecting pipe can be present between the cleaning product inlet and the receiving container for this purpose, which e.g. ends above the receiving container and forms an air gap with same.

The cleaning product can be a product for microbial cleaning and/or a descaling product. The cleaning product can be added to the cleaning product inlet in the form of liquid cleaning product. But it can also be added to the cleaning product inlet in the form of a solid, water-soluble additive (e.g. as a powder, tablet ("tab"), etc.) and then mixed with fresh water from the fresh water connection to produce liquid cleaning product.

A "temporary" waste water outlet is understood in particular to mean an outlet or an opening by means of which for example water discharged from the steam generator can be discharged from the steam generator, and which is not provided as a lasting/permanent fixed connection for connecting to a waste water system. On the contrary users must themselves provide for disposal of the liquid emerging from the temporary waste water outlet, e.g. by collection in a bucket or similar, where relevant via an attachable hose. The temporary waste water outlet can also be referred to simply as a waste water port. The temporary waste water outlet can be realized in the form of a pipe end.

In the first switch position with the pump switched on liquid, in particular cleaning liquid, can therefore be circulated in the liquid circuit. Contact between items to be cooked and cleaning liquid is safely prevented by the bypassing of the steam treatment space. This bypassing can also be implemented simply in constructional terms since, with reference to the steam treatment space, the steam generator is an externally attached steam generator that does not have a fluidic connection to the steam treatment space (just a steam pipe instead). This contrasts particularly with steam treatment appliances that have an evaporator dish inserted into the bottom of the steam treatment space.

The cleaning product inlet can likewise form part of the liquid circuit. However it can also be independent of same. Thus in a development the cleaning product inlet can be connected to a simple feeder pipe that does not form part of the circuit, and that leads directly to the receiving container. In an alternative development the cleaning product inlet is fluidically connected to the receiving container in the first switch position, but not in the second switch position. In an alternative development the cleaning product inlet is not fluidically connected to the receiving container in the first switch position, but is in the second switch position.

In the second switch position the circuit is opened at least to connect the water outlet of the steam generator to the temporary waste water connection. In a development the cleaning product inlet is only provided and/or arranged to be accessible for a user in the second switch position.

The first switch position and the second switch position are set in particular for carrying out cleaning of the water-carrying parts of the steam treatment appliance.

In general further switch positions can be set, in particular automatically by the steam treatment appliance, to enable further functions of the steam treatment appliance. Thus at least one third switch position—where relevant at least one further switch position also—can be provided to set up the steam treatment appliance for steam treating items to be cooked or some other function that does not serve the purpose of cleaning.

The components described above can be connected to each other via pipes and where relevant free fall sections.

The valve system comprises at least one switchable valve by means of which the path of liquid through the steam treatment appliance can be changed with reference to its direction of flow. In particular the circuit can be optionally closed and opened by switching of the valve system. A switch position of the valve system can be understood to mean a specific set of valve settings of individually switchable (e.g. electrically and/or manually switchable but in particular not hydraulically switchable) valves. If a pump is a self-locking pump it can represent a component of the valve system on the basis of its valve function.

In an embodiment the cleaning product inlet and the temporary waste water outlet are integrated into a combined waste water outlet/cleaning product inlet unit (also referred to below, without limiting its generality, as a "combiport"). Thus the advantage of a particularly high level of user friendliness is achieved. The constructional effort is thus also reduced, and the number of holes through the casing of the steam treatment appliance can be kept particularly small.

In an embodiment the valve system has a directional control valve, which in the first switch position fluidically connects the water outlet of the steam generator to the receiving container and in the second switch position connects the water outlet of the steam generator to the temporary waste water outlet and cuts off the fluidic connection to the receiving container. This achieves the advantage that the liquid circuit can be opened and closed in a particularly simple manner in constructional terms. The directional control valve can be realized in the form of a 3/2 directional control valve for example.

In an embodiment
  the directional control valve is realized in the form of a drawer unit having a drawer with a filling tray, which can be pulled out of a casing,
  the casing has a stationary filling neck that can be fluidically connected to the water outlet of the steam generator, and a stationary outlet pipe that leads to the receiving container,
  the filling tray has an outlet opening on its bottom side,
  when the drawer is closed the filling tray can be filled via the filling neck with liquid discharged from the steam generator, and the outlet pipe is fluidically connected to the outlet opening of the filling tray, and
  when the drawer is open the filling tray can be filled via the filling neck with liquid discharged from the steam generator, and the outlet opening of the filling tray is arranged outside the casing of the drawer unit,
  wherein furthermore
  in the first switch position of the valve system the drawer is closed and in the second switch position of the valve system the drawer is open.

This achieves the advantage that by simple opening and closing of the drawer (for example manually or by motor) the liquid circuit likewise opens and closes. Therefore if the drawer is closed the liquid circuit is also closed, and if the drawer is open the liquid circuit is also open. A further advantage consists in the fact that the drawer serves simultaneously as a cleaning product inlet and waste water outlet. To put in cleaning product and to discharge liquid a user just needs to open the drawer.

The drawer unit therefore has a casing built into the steam treatment appliance in a static manner, to which the drawer is connected via a pull-out mechanism. The filling neck and the outlet pipe are therefore also arranged in the steam treatment appliance in a static manner. In particular the drawer has a support or frame, which forms the individual tray or supports it in the form of a separately produced component.

When the drawer is closed water emerging from the filling neck moves into the filling tray. The filling neck is arranged above the filling tray in particular for this purpose. Therefore a free fall section for the emerging liquid is created in particular in the area of the filling tray. The liquid in the filling tray flows out of the filling tray via the outlet opening in the bottom side, and in fact into the outlet pipe and through the outlet pipe into the receiving container. From the receiving container the liquid flows in turn into the steam generator and from there into the filling tray again, etc.

With the aid of the opened drawer two functions can be performed, in particular at different times, and specifically the addition of cleaning product and the discharge of liquid from the steam treatment appliance.

The ability to discharge liquid in a simple and user-friendly manner from the steam treatment appliance is produced for example as follows: with the drawer open liquid emerging from the filling neck flows on into the filling tray and out of the outlet opening. Since the outlet opening is then located outside the casing of the drawer unit and therefore also outside the casing of the steam treatment appliance however, the liquid is routed out of the steam treatment appliance. In other words the filling tray then serves as a liquid duct for routing the liquid out of the steam treatment appliance, which same at that point simply flows away through the outlet opening. To catch the liquid a user can place a container under the pulled-out drawer, connect the outlet opening to a hose, or similar, for example.

The ability to add cleaning product can be implemented as follows: with the drawer open and the liquid flow stopped previously, cleaning product (in particular a non-liquid or respectively solid but water-soluble cleaning product additive, such as powder or, advantageously, a cleaning product tablet) is placed in the filling tray. The drawer is then closed again and the flow of liquid set in motion again, for example by switching on the pump. Then, as described above, the liquid is circulated in the liquid circuit, which is now closed again, whereby liquid introduced into the filling tray dissolves and carries away with it the cleaning product additive. The liquid then circulating in the liquid circuit is then a cleaning liquid.

To remove the cleaning liquid from the steam treatment appliance it is then only necessary for the drawer to be opened again and the cleaning product discharged. To rinse out the steam treatment appliance in order to remove residues of the cleaning liquid—which is advantageous in particular before a subsequent steam treatment process—it is then only necessary for fresh water to be put into the receiving container, circulated or recirculated in the liquid circuit, and then discharged again via the open filling tray. This process can be repeated as often as required.

The above embodiment is particularly simple to implement with just one pump and the drawer unit as the sole directional control valve. To do this the steam generator can be located below the receiving container for example so that liquid located in the receiving container can flow into the steam generator just by the effect of gravity. The outlet opening of the filling tray can also be located above the receiving container so that liquid flowing out through the outlet opening can flow into the receiving container just by the effect of gravity. The pump is then only needed during a cleaning sequence to pump liquid out of the steam generator into the filling tray against the effect of gravity, since the steam generator is then also installed at a lower level than the filling tray.

In an embodiment the drawer unit is arranged above a steam treatment space, the receiving container and the steam generator are arranged to the side of the steam treatment space, and the receiving container is arranged above the steam generator. This produces an arrangement that is accessible and compact in a particularly user-friendly manner.

If the drawer unit can be operated manually its electrical control means can be completely omitted in a development. However the drawer unit can also be moveable by motor means.

It is an advantageous development, in particular for a drawer unit capable of being operated manually, for the steam treatment appliance to be set up to give a user an indication of when the drawer should or must be opened and/or closed. This can be coordinated with the operating status of the pump (switched on or switched off)

The drawer unit can also be used independent of the presence of a liquid circuit in a steam treatment appliance, and then represents a stand-alone invention. The construction of the drawer unit and/or its mechanical and fluidic function as an active substance inlet, liquid outlet when the drawer is open, and liquid pipe system when the drawer is closed can then be all the more in the foreground.

In principle multiple pumps can also be present to convey the liquid, in particular inside the closed liquid circuit also. This can make sense for example in order to implement a particularly compact method of construction or as dictated by other constructional boundary conditions. For example two, three, or even more pumps can be present.

In principle one or more shutoff valves can be present in the route or path of the liquid, alternatively or additionally to at least one directional control valve. This produces the advantage that by this approach the liquid can be routed in particularly diverse ways, and a backflow of the liquid can be prevented particularly reliably. To save on components it is particularly advantageous if at least one pump is a self-locking pump that conveys liquid in the switched-on condition and functions as closing off the shutoff valve for the liquid, in particular in both directions, in the switched-off condition. In general at least one shutoff valve can be realized in the form of a valve that closes off in both directions, and/or at least one shutoff valve can be realized in the form of a valve that closes off in just one direction, for example in the form of a non-return valve.

In another embodiment the steam treatment appliance has a first self-locking pump, a second self-locking pump, a third self-locking pump, and a T-piece or T-like pipe junction, wherein the first self-locking pump is connected to the discharge opening of the receiving container on the suction side and to the water inlet of the steam generator on the delivery side, the second self-locking pump is connected directly to the water outlet of the steam generator on the suction side and to a first connection of the T-piece on the delivery side, a second connection of the T-piece is connected to a lockable combiport, and the third self-locking pump is connected to a third connection of the T-piece on the suction side and to a pipe leading to the receiving container on the delivery side.

This embodiment has the advantage that it permits particularly reliable conveying of liquid in practically any desired height arrangement of the receiving container, steam generator, and combiport. Thus for example the steam generator can be arranged above the steam treatment space, the combiport above the discharge opening of the steam generator (or at approximately the same height as same), and the receiving container below both these components, e.g. behind a rear wall of the steam treatment space. Since the pumps are self-locking they can be regarded as components of the valve system.

The first switch position can be implemented for example in that, with the combiport closed, the first pump, the second pump, and the third pump are switched on. The second switch position can be implemented for example in that, with the combiport open, the second pump is switched on, in particular if the third pump is switched off, or the third pump is switched on, in particular if the second pump is switched off.

The generation of steam to be introduced into the steam treatment space can be achieved in this embodiment for example by fresh water being fed into the receiving container via the fresh water connection and, by the first pump being switched on, conveyed into the steam generator until a required level is achieved. The second pump is switched off and therefore set to be closed so that the steam generator can be filled with the fresh water. The steam generator can then be activated to generate steam. If fresh water has to be added only the first pump needs to be activated again for the duration of filling, where relevant in conjunction with a new supply of fresh water into the receiving container.

To remove water residues left in the steam generator after a steam treatment process it is possible e.g. for the combiport to be opened and then the second pump switched on while the first pump and the third pump are switched off.

A cleaning sequence can be carried out as follows for example in this embodiment:

First—in particular when all pumps are switched off—the combiport is opened and connected to a container filled with liquid cleaning product, e.g. via a hose.

Then the third pump can be switched on, which as a result conveys the liquid cleaning product into the receiving container. The third pump is then switched off again and the combiport closed again.

As an option fresh water can now be fed into the receiving container, e.g. to dilute the cleaning product.

To circulate the cleaning product in a liquid circuit all three pumps are switched on so that the cleaning product is pumped out of the receiving container, through the first pump, through the steam generator, through the second pump, and through the third pump back into the receiving container.

After the circulation phase cleaning product can be discharged by the combiport being opened. Advantageously the third pump is also switched off.

In an optional subsequent rinsing phase fresh water can be fed into the receiving container. In a development, with the first and second pumps switched on and also the third pump switched off, the fresh water can be pumped through the steam generator and onward to the open combiport. Alternatively the fresh water can likewise be circulated in the liquid circuit and then discharged, in particular in a similar manner to that for the cleaning product.

In general the steam generator can be activated during a cleaning sequence, in particular during a circulation phase of same, such that the cleaning product is heated, advantageously to a temperature below its boiling temperature. This achieves the advantage of noticeably increasing the effectiveness of the cleaning product.

In a development the discharge opening of the receiving container is connected to the water inlet of the steam generator via a siphon. This achieves the advantage that steam generated in the steam generator cannot move into the—mostly open—receiving container and then onward into the appliance.

In an embodiment a venturi pipe or a venturi tube is present in the pipe between the water outlet of the steam generator and the waste water outlet, the vacuum connection or take-off pipe of which same is connected to a water-carrying segment of the siphon. This achieves the advantage that, during a discharge of liquid from the steam treatment appliance in the second switch position, the liquid flowing out also sucks dry the siphon due to the venturi effect. Advantageously this effect is particularly strong if liquid is pumped from the steam generator to the waste water outlet.

In a development a non-return valve that closes in the direction of the siphon is present in a connecting pipe between the take-off pipe and the water-carrying segment of the siphon. This achieves the advantage that a backflow of water through the connecting pipe in the direction of the siphon is prevented.

In a development the receiving container has an active connection to an overflow detector, which is set up to detect water overflowing from the receiving container and then initiate at least one action. Thus damage to the appliance and/or a discharge of water out of the appliance can be avoided. The at least one action can comprise e.g. closing off the fresh water connection, outputting an indication to a user (e.g. also to a mobile terminal of the user), etc.

It is an embodiment that
the receiving container has a main chamber on which the discharge opening is present on the bottom side, and an overflow chamber separated from the main chamber by a dividing wall with a freestanding upper edge, which is connected to an overflow pipe,
the steam treatment appliance is set up to detect an overflow of liquid from the main chamber into the overflow chamber, and
the steam treatment appliance is set up to initiate the at least one action based on the detection of liquid that has overflowed.

This embodiment produces the advantage that it is particularly robust and reliable. To detect the overflow of liquid from the main chamber into the overflow chamber the overflow chamber can be fitted with a corresponding sensor, e.g. a moisture sensor, a level sensor, or similar. Alternatively or additionally the overflow pipe can lead to a sensor of this type. Liquid that has passed into the overflow chamber can be routed for example to a floor of the appliance or out of the appliance by means of the overflow pipe.

In a development of same the overflow chamber is fitted with a level sensor to monitor for a predetermined maximum level of liquid being reached in the overflow chamber, and the steam treatment appliance is set up to at least close the fresh water connection upon the predetermined threshold value being reached.

It is an embodiment that the receiving container is equipped with a level sensor, which detects at least a lower level and an upper level in the receiving container. If the receiving container has a main chamber and an overflow chamber it is advantageous if the upper level lies lower than an upper edge of the dividing wall. In this embodiment the steam treatment appliance is set up, depending on a level in the receiving container, in particular of the main chamber, to close the fresh water connection and open a connection to the steam generator, or to open the fresh water connection and close a connection to the steam generator. The opening and closing of the connection between the receiving container and the steam generator can be effected for example by activating or respectively deactivating an electrically controllable shutoff valve. If this embodiment is implemented a particularly simple steam generator can be used, on which just a running-dry or empty status can be detected. If an empty status is detected in the steam generator for example, discharge of liquid into the steam generator is initiated. A procedure of this type is particularly advantageous during a steam treatment sequence. The shutoff valve between the receiving container and the steam generator can also remain permanently open during a cleaning sequence or a rinsing sequence.

In a development the steam generator together with the level sensor form a module ("evaporator module") that can be fluidically linked or connected via pipes.

In a development the cleaning product inlet and the waste water discharge together form a module ("port module") that can be fluidically linked or connected via pipes. For example the drawer unit can be a module.

In a development a pump (in particular a pump sucking liquid out of the steam generator), the siphon, and the venturi tube form a module ("SPV module") that can be fluidically linked or connected via pipes.

In a development the receiving container together with the main chamber and overflow chamber form a module ("overflow module") that can be fluidically linked or connected via pipes.

At least two of the modules described above, in particular all the said modules, can especially just be connected to each other via pipes, which makes their assembly particularly simple, and additionally makes a particularly fault-resistant and robust construction possible.

In a development the steam treatment appliance has a control facility, for example having a microprocessor, a microcontroller, an ASIC, an FPGA, etc. to carry out the method.

In general the drawer described above and/or the combination of venturi tube and siphon can also be used for example on a stand-alone basis with other types of steam cooking appliances, e.g. with steam cooking appliances that have an evaporator tray located in the steam treatment space, that do not form a closed liquid circuit, pumpless steam cooking appliances, etc.

The object is also achieved by means of a method as described above in which after cleaning product has been introduced via the cleaning product inlet, with the valve system in the first switch position, the cleaning product is circulated in the closed liquid circuit with the aid of at least one pump being switched on, and which said cleaning product, with the valve system in the second switch position, is discharged on the temporary waste water outlet. The method can be realized in a similar manner to the steam treatment appliance and has the same advantages.

BRIEF DESCRIPTION OF THE DRAWINGS

The properties, features, and advantages of this invention as described above, and also the way that same are achieved will be more clearly and more distinctly understood in conjunction with the following schematic description of an exemplary embodiment, which is explained in detail in conjunction with the drawings.

DETAILED DESCRIPTION OF EXEMPLARY EMBODIMENTS OF THE PRESENT INVENTION

Figure 1:
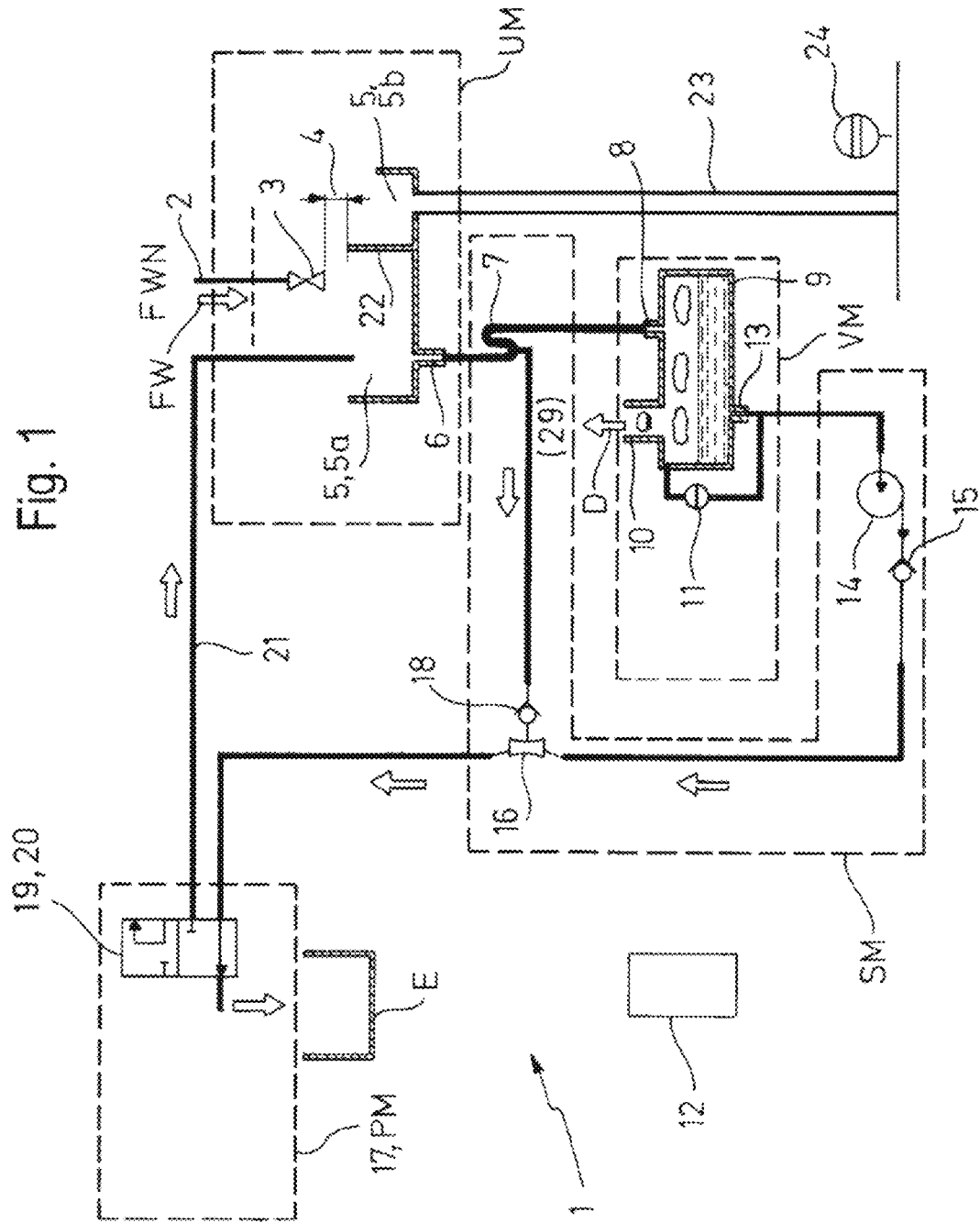
FIG. 1 shows a drawing of a steam treatment appliance according to a first exemplary embodiment.

FIG. 1 shows a drawing of a steam treatment appliance 1, which is permanently connected to a fresh water network FWN by way of a fixed water connection 2. The fixed water connection 2 has an electrically switchable inlet valve or shutoff valve 3. When the fresh water connection 2 is open fresh water FW flowing in under pressure falls via an air gap 4 into a main chamber 5a of a receiving container 5. The air gap 4 meets the requirements of IEC 61770.

The main chamber 5a being open at the top side can therefore be filled with fresh water FW by way of the fixed water connection 2. It has a discharge opening 6 on the bottom side, which is connected via a siphon 7 to a water inlet 8 on the cover side of a steam generator 9. Purely by way of example a steam discharge neck 10 is also present in the cover of the steam generator 9, via which steam D can be introduced into a steam treatment space 29 drawn in only as a directional indicator.

The steam generator 9 is fitted with a level sensor 11, by means of which a maximum level and a minimum level (e.g. empty status) of liquid in the steam generator 9 can be detected in this case. The steam treatment appliance 1 is equipped such that it can effect switching of the shutoff valve 3 depending on a level detected by the level sensor 11. In a possible development the steam treatment appliance 1 has a control facility 12 for this.

Furthermore the steam generator 9 has a water outlet 13 in its bottom side, which is fluidically connected to a suction side of a self-locking pump 14. A pressure side of the pump 14 is fluidically connected via a non-return valve 15 to one side of a venturi tube 16. The other side of the venturi tube 16 is fluidically connected to a drawer unit 17. A take-off pipe of the venturi tube 16 is connected via a further non-return valve 18 to the water-carrying zone of the siphon 7.

The drawer unit 17 has a drawer 19 that can be moved manually and/or by motor, with a filling tray 20. The filling tray 20 serves both as a cleaning product inlet and also as a temporary waste water outlet, i.e. as a combiport. The drawer unit 17 functions in similar fashion to a 3/2 directional control valve. In the valve setting shown a first liquid connection is connected to a second liquid connection in the form of the waste water outlet. A blocked-off third liquid connection is connected to a pipe 21 leading directly to the main chamber 5a. In the other valve setting the first liquid connection and the third liquid connection are connected directly to each other via the filling tray, while the waste water outlet is not available.

Furthermore the receiving container 5 has an overflow chamber 5b separated by a dividing wall 22 with a freestanding upper side. The overflow chamber 5b has an overflow pipe 23 on its bottom side that leads to a moisture or liquid detector 24.

The above arrangement can be implemented in a modular construction system as indicated by the dashed-line boxes with an evaporator module VM, a port module PM, an SPV module SM, and an overflow module UM.

Figure 2A:
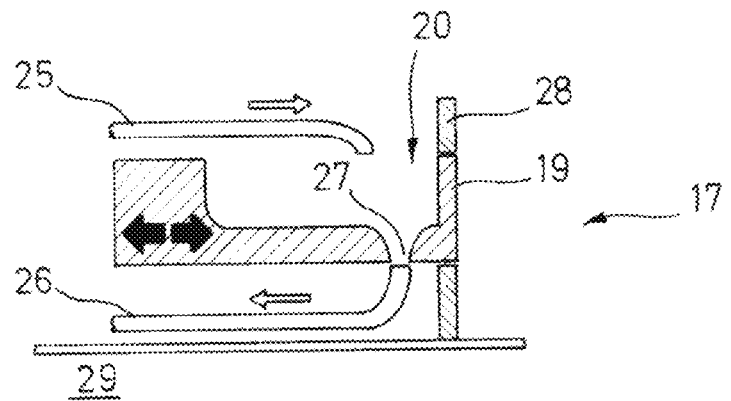
FIG. 2A shows a drawing of a drawer unit with closed drawer, in the form of a cross-section in a side view.

FIG. 2A shows a drawing of the drawer unit 17 with closed drawer 19, in the form of a cross-section in a side view. The drawer unit 17 can be arranged above the steam treatment space 29 for example, and in fact such that the drawer 19 closes flush with a front panel 28 in the closed state.

The drawer 19 can be pulled out of a casing (top illustration) of the drawer unit 17, and is fitted with the filling tray 20. The drawer unit 17 furthermore has a stationary filling neck 25 connected via the pump 14 to the water outlet 13 of the steam generator 9, and also a stationary outlet pipe 26 that leads via the pipe 21 to the main chamber 5a or corresponds to the pipe 21. With the drawer 19 in the closed state the outlet pipe 26 is connected to a bottom-side outlet opening 27 of the filling tray 20.

With the drawer 19 in the closed state liquid is let into the filling tray 20 via the filling neck 25, it flows away via the outlet opening 27 into the outlet pipe 26, and in fact under the influence of gravity into the main chamber 5a.

Figure 2B:
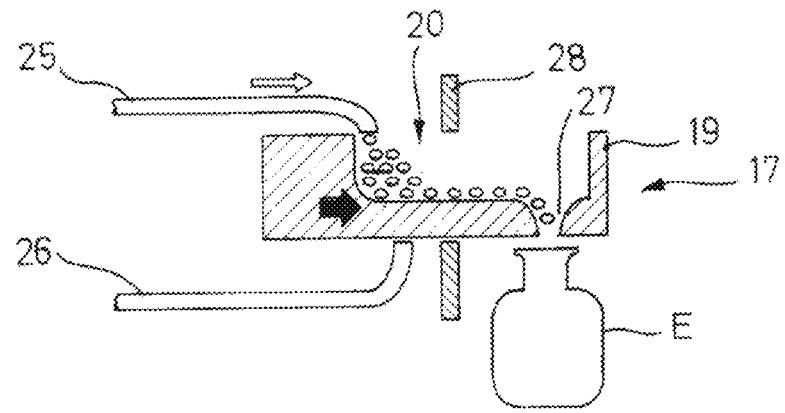
FIG. 2B shows a drawing of the drawer unit with open drawer and liquid being added, in the form of a cross-section in a side view.

FIG. 2B shows a drawing of the drawer unit 17 with open drawer 19 and with liquid being added out of the filling neck 25, in the form of a cross-section in a side view. In this case the filling tray 20 can be filled furthermore, via the filling neck 25, with liquid discharged from the steam generator 9. Since the outlet opening 27 of the filling tray 20 is arranged outside the casing of the drawer unit 17 it is then no longer covered by the outlet pipe 26 but instead stands open. If liquid is put into the filling tray 20 through the filling neck 25 therefore it flows away freely through the outlet opening 27. It can then be caught by a collecting container such as a bucket E and disposed of for example.

Figure 2C:
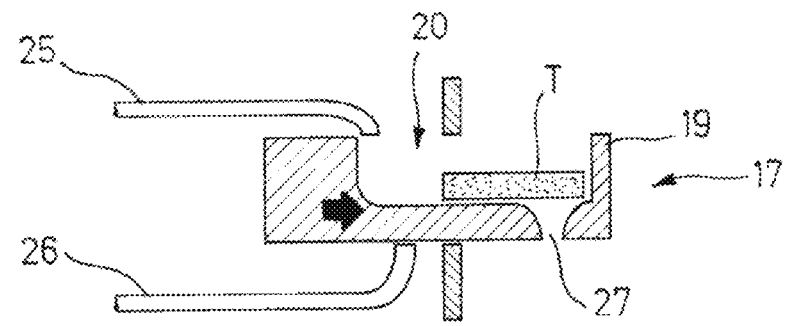
FIG. 2C shows a drawing of the drawer unit with open drawer and inserted cleaning product tablet, in the form of a cross-section in a side view.

FIG. 2C shows a drawing of the drawer unit 17 with open drawer and inserted cleaning product tablet T, now no liquid is being added via the filling neck 25, in the form of a cross-section in a side view. The cleaning product tablet T can simply be inserted by a user for example.

Figure 2D:
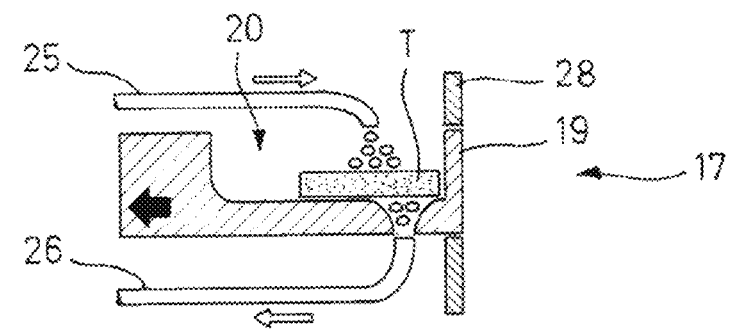
FIG. 2D shows a drawing of the drawer unit with closed drawer with inserted cleaning product tablet and liquid being added, in the form of a cross-section in a side view.

FIG. 2D shows a drawing of the drawer unit 17 with closed drawer 19 and with inserted cleaning product tablet T and liquid being added via the filling neck 25, in the form of a cross-section in side view. The added liquid dissolves the cleaning product tablet T and thereby brings the associated cleaning product into the main chamber 5a.

To carry out a steam treatment operation or sequence, in which items to be cooked is exposed to steam, the pump 14 is switched off and therefore set to be fluidically closed. At the start of a steam treatment operation the steam generator 9 is emptied, which is detected by the level sensor 11. Detection of the empty status triggers the shutoff valve 3 to open so that fresh water FW moves into the main chamber 5a and from there flows via the discharge opening 6 and through the siphon 7 into the steam generator 9. This takes place until the level sensor 11 detects a sufficiently high level for operating the steam generator 9. The shutoff valve 3 is then closed and the steam generator 9 or its heating element activated. The steam treatment operation can be carried out with the drawer 19 open or closed.

To remove residual water from the steam treatment appliance 1 after a steam treatment operation a user can open the drawer 19 and start up the pump 14 with the shutoff valve 3 closed. The pump 14 then pumps residual water located in the steam generator 9 out of the steam treatment appliance 1 via the temporary waste water outlet 20. A user can catch this residual water in a bucket E or similar and dispose of it for example. As the residual water is pumped out of the steam generator 9 a partial vacuum is simultaneously generated at the take-off pipe of the venturi tube 16, due to which residual water standing in the siphon 7 is also sucked out. The non-return valve 15 and the non-return valve 18 prevent the residual water flowing back. When discharge of the residual water is completed the pump 14 can be switched off again and the drawer 19 closed again.

A cleaning sequence for cleaning water-carrying parts and components of the steam treatment appliance 1 can be broken down, in a variant, into three phases, specifically a phase for introducing the cleaning product, a circulation phase or actual cleaning phase in which the cleaning product is circulated in the steam treatment appliance 1 to clean it, and a subsequent rinsing phase for removing cleaning product residues.

To introduce the cleaning product a cleaning product tablet T is first inserted in the filling tray 20 and then the drawer 19 closed, as shown in FIG. 2C. Closing the drawer 19 results in a liquid circuit being configured in the steam treatment appliance 1.

In the circulation phase freshwater FW can first be let into the main chamber 5a by opening the shutoff valve 3, which said fresh water then moves through the siphon 7 and the steam generator 9 to the pump 14. When the pump 14 is switched on the water is pumped further to the filling neck 25 and as a result into the filling tray 20. There the water dissolves the cleaning product tablet T so that liquid cleaning product then moves further into the main chamber 5a. From there the cleaning product is again routed through the siphon 7 and the steam generator 9 to the pump 14, etc. By operating the pump 14 cleaning product is therefore circulated or respectively recirculated in a circuit in the steam treatment appliance 1 and thereby cleans the surfaces coming into contact with it. In particular the cleaning product can have a descaling effect. Once an adequate amount of fresh water FW has flowed in the shutoff valve 3 can be closed again. Activation or triggering of the shutoff valve 3 by the level sensor 11 of the steam generator 9 is not needed in the circulation phase, but can be used in a similar manner in a variant.

In the rinsing phase the drawer 19 is opened similar to FIG. 2B and the pump 14 activated while fresh water FW is fed in through the open shutoff valve 3. Additionally the fresh water FW can be circulated similar to the circulation phase, only then being discharged via the open drawer 19. This produces the advantage that the pipe 21 is also rinsed through.

The steam treatment appliance 1 has a valve system with two specifically settable valves, namely the drawer unit 17 in the form of a directional control valve and the pump 14 in the form of a shutoff valve.

In a first switch position the drawer 19 of the drawer unit 17 is closed and the pump 14 switched on so that a closed liquid circuit is formed bypassing the steam treatment space 29, with at least the receiving container or its main chamber 5a respectively, the steam generator 9, and the pump 14 as components.

In a second switch position the drawer 19 of the drawer unit 17 is open and the pump 14 switched on so that the circuit is open and a connection is established between the water outlet of the steam generator and the temporary waste water connection.

In a third switch position provided for steam treatment the pump 14 is switched off.

Figure 3:
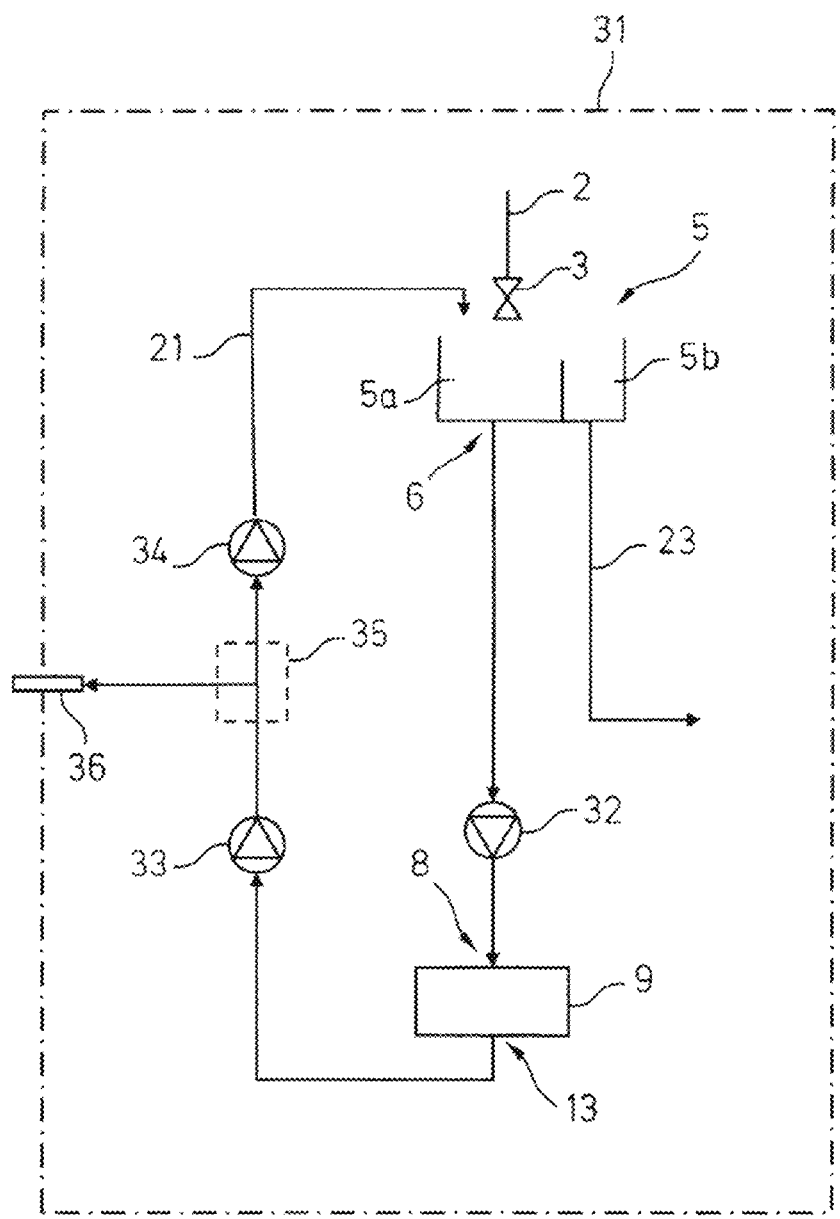
FIG. 3 shows a greatly simplified drawing of a steam treatment appliance according to a second exemplary embodiment.

FIG. 3 shows a greatly simplified drawing of a steam treatment appliance 31. The steam treatment appliance 31 now has a first pump 32, a second pump 33, and a third pump 34. One or more of the pumps 32, 33, 34 can be realized in the form of self-locking pumps, or a corresponding valve can be assigned to them, for example an electrically switching valve or a non-return valve.

The first pump 32 is connected to the discharge opening of the main chamber 5a of the receiving container 5 on the suction side, and to the water inlet 8 of the steam generator 9 on the delivery side. A siphon 7 can be provided between the receiving container 5 and the steam generator 9, but is not necessary.

The second pump 33 is connected directly (i.e. not via a further pump) to the water outlet 13 of the steam generator 9 on the suction side, and to a first connection of a branching piece or T-piece respectively 35 on the delivery side.

A second connection of the T-piece 35 is connected to a lockable combiport 36. This combiport 36 can be a neck or pipe end that can be optionally closed or opened by a user manually by means of a stopper or some other sealing element for example.

The third pump 34 is connected to a third connection of the T-piece 35 on the suction side and to a pipe 21 leading to the receiving container 5 on the delivery side.

In the present case the valve system comprises the three self-locking pumps 32, 33, 34, or otherwise corresponding valves.

To add or introduce cleaning product in a second switch position of the valve system for example the first pump 32 and the second pump can be switched off and therefore have a blocking effect, and the combiport 36 immersed in a container filled with liquid cleaning product. Switching on the third pump 34 results in the liquid cleaning product being sucked in and pumped into the main chamber 5a. Then the combiport 36 can be closed again. The cleaning product can be diluted if necessary by opening the shutoff valve 3.

To cause the cleaning liquid to circulate a first switch position of the valve system is engaged, in which all pumps 32 to 34 are switched on and therefore switched to allow passage in the direction of flow.

To discharge liquid the combiport 36 is opened and the first pump 32 and the second pump 33 switched on while the third pump 34 remains switched off.

The switch position of the valve system engaged for flushing out residual cleaning product can be similar to discharging liquid, but in this case the shutoff valve 3 is opened at least temporarily to feed in fresh water FW. Previously introduced fresh water FW can also be circulated.

A steam treatment operation can be implemented for example by the second pump 33 and the third pump 34 being switched off and therefore having a blocking effect, and the first pump 32 only being switched on if the steam generator 9 is to be refilled.

This construction has the advantage that the receiving container 5, the steam generator 9, and the combiport 36 However, depending on the relative construction height of the receiving container 5, steam generator 9, and combiport 36, one or two of the pumps can also be omitted or a functionally equivalent blocking valve used in place of same.

In addition a user can utilize the steam treatment appliance such that a container full of cleaning liquid is first connected to the combiport 36, the steam treatment appliance 31 automatically sucks in the cleaning liquid, causes it to circulate and outputs it again into the container after cleaning—where relevant also liquid from a repeat rinse operation.

Figure 4:
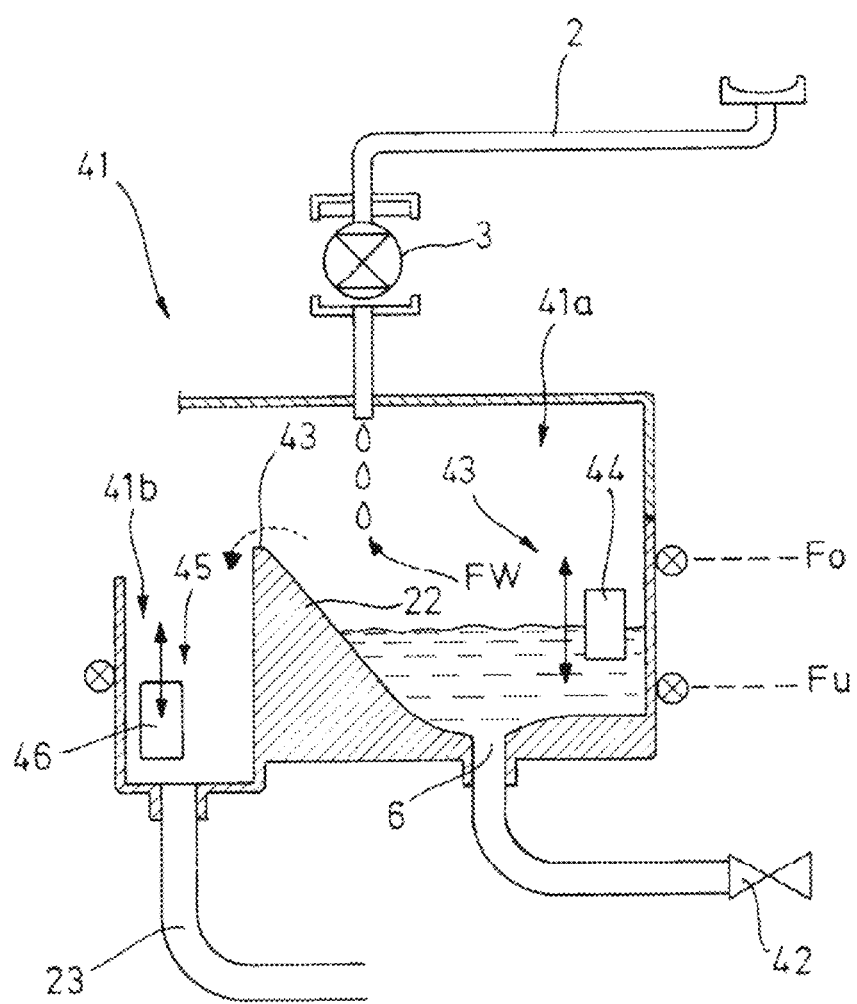
FIG. 4 shows a drawing of a receiving container, in the form of a cross-section in a side view.

FIG. 4 shows a drawing of a receiving container 41 that can be used in place of the receiving container 5 for example, in particular with the steam treatment appliance 31, in the form of a cross-section in a side view.

The receiving container 41 has a main chamber 41a and a secondary chamber 41b. The discharge opening 6 of the main chamber 41a can be closed off by a valve 42. This can correspond to the pump 32 in the case of the steam treatment appliance 31 for example.

A level sensor 43, e.g. using a magnetic float switch 44, is present in the main chamber 41a, by means of which a lower level Fu and an upper level Fo (that lies below the height of the upper edge of the dividing wall 43) can be detected in the main chamber 41a.

This can be utilized for a steam treatment sequence as follows for example: first fresh water FW is filled into the main chamber 41a with valve 42 closed until the level sensor 43 detects that the upper level Fo has been reached. Then the shutoff valve 3 is closed. The main chamber 41a is therefore filled with fresh water FW. If the level sensor 11 of the steam generator 9 then detects the steam generator 9 running dry, or a low level respectively, the valve 42 is opened (e.g. the pump 32 switched on). This results in the fresh water FW being transported into the steam generator 9, resulting in its level rising. When the empty level or low level respectively in the steam generator 9 no longer applies the valve 42 is closed again. Additionally the shutoff valve 3 is opened again when the lower level Fu is reached in the main chamber 41a, and in fact until the fresh water FW reaches the upper level Fo again. This can be repeated as often as required. An advantage of providing the level sensor 43 in the receiving container 41, or in this case the main chamber 41a respectively, consists in the fact that a running-dry of the steam generator 9 needs to be detected, which can be implemented particularly simply and cost-effectively.

If liquid F in the main chamber 41a rises above the upper edge of a dividing wall 42 separating the two chambers 41, 41b it overflows into the secondary chamber 41b, as indicated by the dotted arrow. An overflow of this type can point to an undesirable constriction in a water-carrying part upstream of the receiving container 41, a possible malfunctioning of a valve, or similar.

A level sensor 45 is likewise present in the overflow chamber 41b, which can only detect one level however, and which can likewise use a magnetic float switch 46 for example. The overflow pipe 23 is comparatively narrow so that small quantities of overflowing liquid can move into the overflow pipe 23 without the float switch 46 being moved, which reduces the likelihood of false alarms. If the quantity of overflowing liquid is large however, the level in the overflow chamber 45 rises, the float switch 46 is carried upward, and it operates. As a result of it operating at least one action such as closing the shutoff valve 3 can include outputting an indication (optical and/or acoustic signal, sending of a text message, etc.) etc. This variant has the advantage that a detector at the other end of the overflow pipe 23 can be omitted (but does not need to be).

The present invention is naturally not limited to the exemplary embodiment shown.

In general "one" etc. can be understood to mean a singular or a plural, in particular in the sense of "at least one" or "one or more" etc. unless this is explicitly excluded, e.g. by the expression "exactly one" etc.

A statement of a number can also comprise exactly the stated number as well as a customary tolerance range, unless this is explicitly excluded.

The invention claimed is:

1. A steam treatment appliance, comprising:
a steam treatment space;
a fixed water connection;
a receiving container fillable with fresh water via the fixed water connection and having a discharge opening;
a steam generator arranged outside the steam treatment space and having a water inlet for fluidic connection to the discharge opening of the receiving container and a water outlet for fluidic connection to the receiving container;
a pump;
a cleaning product inlet for fluidic connection to the receiving container;
a temporary waste water outlet;
a valve system switchable between a first switch position in which a closed liquid circuit is formed with at least the receiving container, the steam generator, and the pump while bypassing the steam treatment space, and a second switch position in which the liquid circuit is opened to connect the water outlet of the steam generator to the temporary waste water outlet; and
a T-piece;
wherein the pump comprises a first pump, a second pump, and a third pump,
the first pump being a self-locking pump which connected to the discharge opening of the receiving container on a suction side of the first pump and to the water inlet of the steam generator on a delivery side,
the second pump being a self-locking pump which is connected directly to the water outlet of the steam generator on the suction side of the second pump and to a first connection of the T-piece on a delivery side of the second pump, and
the third pump being a self-locking pump, said T-piece having a second connection connected to a lockable combiport, said third self-locking pump being connected to a third connection of the T-piece on a suction side of the third pump and to a pipe leading to the receiving container on a delivery side of the third pump.

2. The steam treatment appliance of claim 1, wherein the cleaning product inlet and the temporary waste water outlet are integrated into the combiport.

3. The steam treatment appliance of claim 1, wherein the valve system includes a directional control valve configured to fluidically connect, in the first switch position, the water outlet of the steam generator to the receiving container and, in the second switch position, to connect the water outlet of the steam generator to the temporary waste water outlet and to cut off the fluidic connection to the receiving container.

4. The steam treatment appliance of claim 1, further comprising:
a siphon via which the discharge opening of the receiving container is connected to the water inlet of the steam generator; and a venturi tube which is disposed in a pipe between the water outlet of the steam generator and the waste water outlet and which includes a take-off pipe connected to the siphon.

5. The steam treatment appliance of claim 1, wherein the receiving container includes a main chamber having a bottom side on which the discharge opening is present, and an overflow chamber which is separated from the main chamber by a dividing wall with a freestanding upper edge and which is connected to an overflow pipe, said steam treatment appliance being set up to detect an overflow of liquid from the main chamber into the overflow chamber and to initiate at least one action when the overflow of the liquid has been detected.

6. The steam treatment appliance of claim 1, wherein the receiving container includes a level sensor, which detects at least a lower level and an upper level in the receiving container, said steam treatment appliance being set up such that depending on a level in the receiving container the steam treatment appliance closes the fresh water connection and opens a connection to the steam generator, or opens the fresh water connection and closes the connection to the steam generator.

7. The steam treatment appliance of claim 1, wherein, in the first switch position, the pump is configured to circulate and/or recirculate the fresh water supplied to the closed liquid circuit from the fixed water connection, a cleaning product supplied to the closed liquid circuit from the cleaning product inlet, or a combination thereof, through the closed liquid circuit formed with at least the receiving container, the steam generator, and the pump.

8. The steam treatment appliance of claim 2, wherein the combiport is fluidly connected to the receiving container in a manner separate from the fixed water connection.

9. A steam treatment appliance, comprising:
a steam treatment space;
a fixed water connection;
a receiving container fillable with fresh water via the fixed water connection and having a discharge opening;
a steam generator arranged outside the steam treatment space and having a water inlet for fluidic connection to the discharge opening of the receiving container and a water outlet for fluidic connection to the receiving container;
a pump;
a cleaning product inlet for fluidic connection to the receiving container;
a temporary waste water outlet; and
a valve system switchable between a first switch position in which a closed liquid circuit is formed with at least the receiving container, the steam generator, and the pump while bypassing the steam treatment space, and a second switch position in which the liquid circuit is opened to connect the water outlet of the steam generator to the temporary waste water outlet,
wherein the valve system includes a directional control valve configured to fluidically connect, in the first switch position, the water outlet of the steam generator to the receiving container and, in the second switch position, to connect the water outlet of the steam generator to the temporary waste water outlet and to cut off the fluidic connection to the receiving container,
wherein the directional control valve is realized in the form of a drawer unit including a casing and a drawer with a filling tray, which can be pulled out of the casing and includes an outlet opening on a bottom side thereof, said casing including a stationary filling neck for fluidic connection to the water outlet of the steam generator, and a stationary outlet pipe that leads to the receiving container, wherein when the drawer is closed the filling tray is fillable via the filling neck with liquid discharged from the steam generator, and the outlet pipe is fluidically connected to the outlet opening of the filling tray, and when the drawer is open the filling tray is fillable via the filling neck with liquid discharged from the steam generator, and the outlet opening of the filling tray is arranged outside the casing of the drawer unit, said drawer being closed in the first switch position of the valve system and being open in the second switch position of the valve system.

10. The steam treatment appliance of claim 9, wherein the drawer unit is arranged above the steam treatment space, wherein the receiving container and the steam generator are arranged to a side of the steam treatment space, and wherein the receiving container is arranged above the steam generator.

11. A steam treatment appliance, comprising:
a steam treatment space;
a fixed water connection;
a receiving container fillable with fresh water via the fixed water connection and having a discharge opening;
a steam generator arranged outside the steam treatment space and having a water inlet for fluidic connection to the discharge opening of the receiving container and a water outlet for fluidic connection to the receiving container;
a pump;
a cleaning product inlet for fluidic connection to the receiving container;
a temporary waste water outlet;
a valve system switchable between a first switch position in which a closed liquid circuit is formed with at least the receiving container, the steam generator, and the pump while bypassing the steam treatment space, and a second switch position in which the liquid circuit is opened to connect the water outlet of the steam generator to the temporary waste water outlet;
a siphon via which the discharge opening of the receiving container is connected to the water inlet of the steam generator; and
a venturi tube which is disposed in a pipe between the water outlet of the steam generator and the waste water outlet and which includes a take-off pipe connected to the siphon.

* * * * *